Nov. 29, 1955 S. S. APPLETON ET AL 2,725,471

POTENTIAL STORAGE CIRCUITS

Filed April 26, 1951

INVENTORS
SCOTT S. APPLETON
MILLARD M. BRENNER

BY Harry M. Saragovitz

Attorney 2,725,471
Patented Nov. 29, 1955

2,725,471

POTENTIAL STORAGE CIRCUITS

Scott S. Appleton and Millard M. Brenner, Belmar, N. J., assignors to the United States of America as represented by the Secretary of the Army Application April 26, 1951, Serial No. 223,128

7 Claims. (Cl. 250—27)

Figure 1:
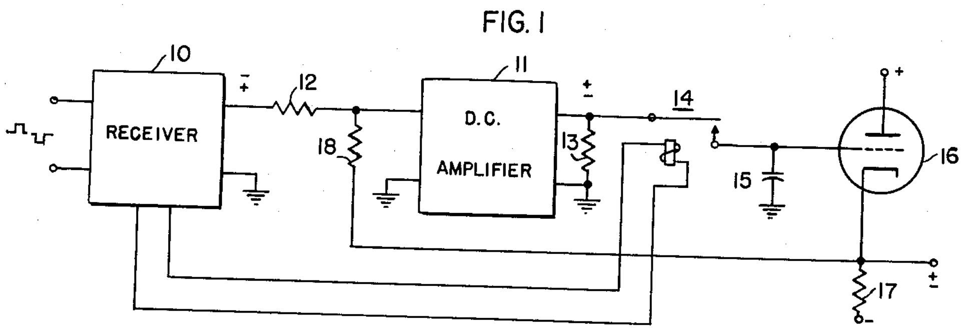

(Granted under Title 35, U. S. Code (1952), sec. 266)

The invention described herein may be manufactured and used by or for the Government for governmental purposes, without the payment of any royalty thereon.

This invention relates to potential storage circuits. In particular, the invention relates to a circuit arrangement for storing potentials so as to provide power sources of potentials which are substantially equal to the peak value of received pulses and in which the stored potential is maintained and readjusted in value in accordance with subsequently received pulses. Particularly, the invention relates to a storage circuit in a computer circuit or a data transmission system to provide a plurality of D.-C. potentials, either positive or negative, which correspond to the peak values of particular received pulses.

Potential storage circuits have a variety of uses in the radio, radar and the electronic art, but in certain types of computers and in data transmission systems it has been found necessary to provide sources of D.-C. control voltage which very precisely correspond to the peak value of received pulses which represent received data and to hold the stored potentials for relatively long intervals of time and at the same time permit power to be drawn from the stored potential source. The prior art storage arrangements for accomplishing such operation have lacked precision and have ordinarily been found unsuitable to maintain the stored potential over a long interval of time and in the form of a low impedance voltage source.

According, it is an object of the present invention to provide a D.-C. storage circuit arrangement which avoids many of the disadvantages and limitations of prior art practice.

It is also an object of the present invention to provide a low impedance source of D.-C. potential, positive or negative as may be required, and of amplitude which precisely equals the peak value of a received pulse and which is adjusted in amplitude in accordance with the peak value of subsequently received pulses.

It is a major object of the present invention to provide a simplified D.-C. storage arrangement which provides a plurality of low impedance sources of D.-C. potentials each of which is equal to and corresponds to the peak values of particular received pulses and which uses only a single amplifying unit.

In accordance with the present invention, there is provided a storage circuit for producing a low impedance source of D.-C. potential of amplitude equal to the peak value of a short duration pulse and for periodically adjusting the amplitude in accordance with the peak values of subsequently received pulses which comprises a negative feed-back amplifier circuit for comparing the stored potential with the peak value of each received pulse and means for operating said amplifier only during the occurrence of a received pulse.

Also in accordance with the present invention, a multiple storage circuit comprises a negative feed-back amplifier for producing a plurality of low impedance potential sources each substantially equal to and corresponding to the peak values of a particular sequence of received pulses. The amplifier comprises a high gain amplifying unit and a plurality of potential storage units and means for coupling each of the storage units between the output of the amplifier unit and the input thereof to establish a feed-back path during the occurrence of the pulses of the particular sequence to which it corresponds.

For a better understanding of the invention, together with other and further objects thereof, reference is had to the following description taken in connection with the accompanying drawing, and its scope will be pointed out in the appended claims.

Figure 3:
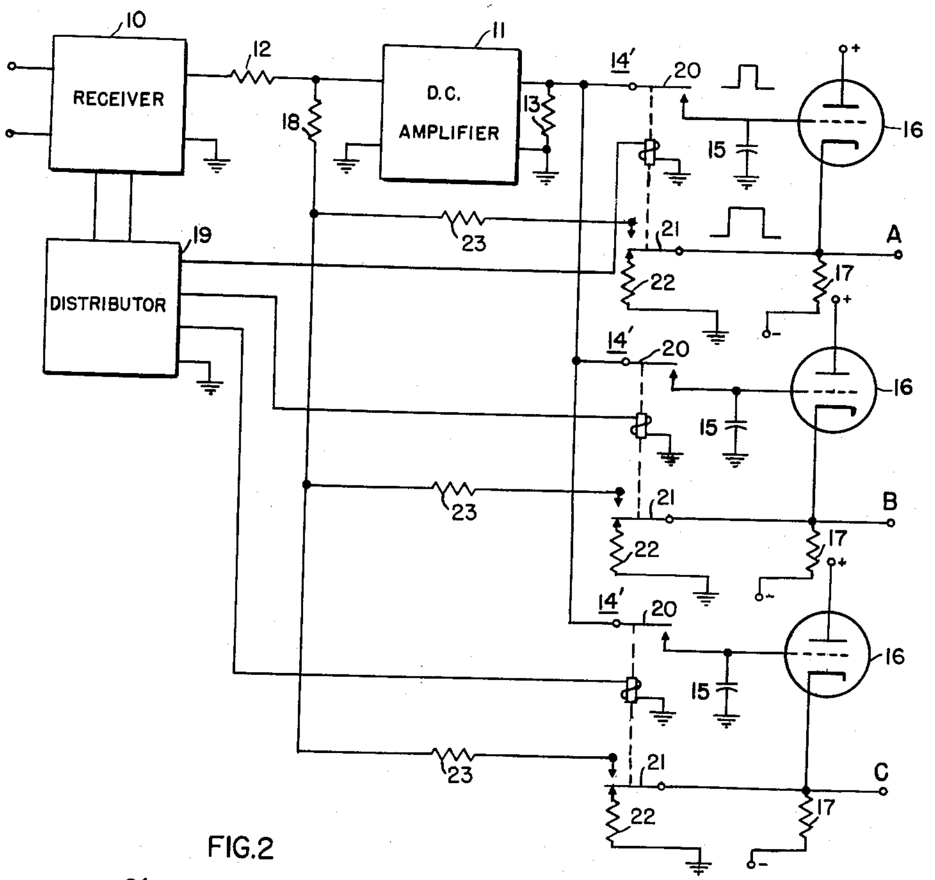
Figure 2:
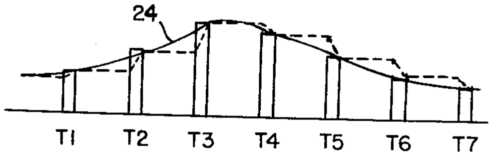

In the drawing, Fig. 1 illustrates the fundamental arrangement of the present invention by a diagram, partly in block and partly schematic; Fig. 2 is a graph for use in explaining the operation of Fig. 1, and Fig. 3 is a diagram similar in part to Fig. 1 and illustrating a preferred arrangement of the invention which provides a plurality of sources of stored D.-C. potential.

Referring now more particularly to Fig. 1, a receiver 10 having input terminals for receiving data signals in the form of short duration pulses of positive or negative polarity is coupled via the impedance 12 to the input of a D.-C. amplifier unit 11. The positive or negative output voltage of unit 11 is developed across a load resistor 13, which in turn is coupled to the control grid of electron tube 16 via the contact through the relay 14. A separate output control circuit from receiver 10 is coupled to the winding of relay 14 to provide for closing relay 14 during the reception of a pulse. A storage condenser 15 is shown connected between the control grid of 16 and ground and an output terminal is provided for the voltage drop developed across the cathode resistor 17; the arrangement constituting a cathode follower circuit. The output potential developed across resistor 17 is also carried back to the input of amplifier 11 via impedance 18 to provide a negative feed-back path.

Considering now the operation of the system, reference is made to Fig. 2 which shows successive pulses labeled T1, T2, T3, etc., each having an amplitude corresponding to the amplitude of the curve 24 at the time of the occurrence of the pulse. The pulses which are assumed to be applied to the input of receiver 10 are, therefore, amplitude modulated in accordance with the signal or information curve 24 and constitute sampled values of incoming data. The receiver may be provided with circuits of any suitable type, so long as the amplitudes of the incoming pulses are not affected; the arrangement being such that a control pulse is developed and sent to the winding of relay 14 to actuate it in time with or preferably slightly after the time at which the pulse voltage appears at the output of amplifier 11. For example, suitable delay circuits in the receiver 10 are provided so that the relay 14 operating pulse is made to arrive at the relay winding at the instant or slightly after the signal pulse arrives at the output of amplifier 11. The amplifier 11 may be any known type of D.-C. amplifier capable of producing high voltage amplification and designed so that the pulse output developed across load resistor 13 will be of opposite polarity to the pulse applied across the input terminals. Thus, if the input pulse to amplifier 11 is negative, the output pulse will be positive or vice versa.

The voltage developed across load resistor 13 during the pulse interval will begin to charge storage condenser 15 and simultaneously therewith, and in the same polarity, the voltage across resistor 17 will change and be applied to the input of amplifier 11. It will be clear that the voltage developed across resistor 17, which is of opposite polarity to the pulse input of amplifier 11, opposes the pulse input and a condition of equilibrium is rapidly reached through negative feed-back action so that the voltage across resistor 17 reaches, or very closely approaches, equality with the pulse peak voltage. In order that this condition may obtain the D.-C. amplifier 11 is designed to provide high amplification or gain and the charging or discharging of condenser 15 and the corresponding change in voltage across output resistor 17 is accomplished in a very short time within the interval of duration of the applied input pulse. At the end of the pulse interval, or preferably slightly before its end, the relay 14 opens, leaving condenser 15 charged and in correspondence a steady flow of current through electron tube 16 and resistor 17 is maintained to provide a low impedance source of D.-C. output at the terminal of resistor 17. Thereafter, the charge and output potential is maintained until the occurrence of the next received pulse.

This operation is indicated in Fig. 2, where the stored charge is shown by the horizontal dash lines between the pulse intervals T1, T2, T3, etc., and it will be evident that the complete action of readjustment of the level of the stored voltage is accomplished within each pulse interval as indicated by the sloped dash lines which show that where the curve 24 is rising the charge is increased, and where the curve 24 is falling, the charge is decreased, abruptly within each pulse interval.

It is well known that in the cathode follower form of circuit shown, a slight difference will exist between the charge supplied to condenser 15 and the D.-C. voltage output across cathode resistor 17 and in prior art arrangements the accuracy of stored voltage has been primarily associated with the charge provided to the storage condenser or other element which is employed. This charge of the storage device is the end result of the storage operation and its value can seldom be measured or utilized since the storage devices are inherently high impedance elements. In the present invention, however, equilibrium is reached by the feed-back process of comparing the actual output potential across resistor 17 with the peak value of the input pulse and adjusting the output potential to equal the pulse amplitude. Equilibrium is quickly reached due to the negative feed-back action so that the two compared voltages become substantially equal while the actual voltage stored in condenser 15 will be somewhat different. Since the circuit arrangement for tube 16 is that of a cathode follower, the source of output is of low impedance and substantial power may be drawn from the source.

In practice, it will be evident that with the high gain amplifier unit 11, a relatively small input signal is actually applied which is the difference between the received pulse and the stored output potential. As has been pointed out, the input to receiver 10 will be in the form of pulses, either positive or negative, as indicated by the pulse wave forms shown at the input terminals. The polarity reversal of amplifier 11 is indicated by the +, − signs of the drawing. In practice, the output of amplifier 11 may have positive and negative excursions of the order of ±100 volts. The positive and negative operating potentials supplied to the tube 16 are, in practice, of the order of plus and minus 250 volts and, accordingly, the potential of the output terminal relative to ground may have positive and negative excursions of the order of 100 volts.

When the input pulse ceases, the stored voltage persists and the input to the amplifier, in the arrangement of Fig. 1, will then be the stored voltage alone which will overload amplifier 11. This overload, although it occurs when no output from amplifier 11 can reach the grid of tube 16, is nevertheless undesirable and, accordingly, it is preferable to arrange the circuits so that the stored output potential is also removed from the input to amplifier 11 after the occurrence of a pulse. This and other improved arrangements of the circuit are shown in Fig. 3, where the circuit is arranged to provide a plurality of stored D.-C. potentials.

In Fig. 3, parts of the arrangement are similar to that shown in Fig. 1, and corresponding elements are similarly labeled. The circuit provides for a plurality of stored output potentials; three of which are shown to illustrate the principle. Thus, in Fig. 3, pulses are applied to the input terminals of the receiver 10 and the output of 10 is coupled to the input of high gain D.-C. amplifier 11 via the impedance 12. Here again the pulse output of 11 is developed across the load resistor 13 and is supplied in sequence to the grids of three similar electron tubes 16 via the upper contacts of relays 14'. Similarly, three storage condensers 15 and cathode resistors 17 are provided to form three cathode follower output storage units which are distinguished by the labels A, B and C. In each of these storage circuits the output cathode resistors 17 are coupled back to the input of amplifier 11 through the impedance 18 via a lower contact of a relay 14'. Also included in each feed-back path is an impedance 23. The impedances 18 and 23 are, in practice, equalizing networks comprised of resistance and capacitance elements designed to provide the proper feed-back characteristic. Receiver 10 is designed to receive sequences of pulses representing data from a plurality of data sources corresponding to the number of storage output circuits and these pulses will ordinarily be interleaved in time of occurrence in what is commonly termed timed division multiplex. For example in Fig. 2, the intervals between the pulses T1, T2 and T3 may contain additional time multiplexed pulses (positive or negative) representing data from a number of sources transmitted sequentially in known manner. Accordingly, an output of receiver 10 is also coupled to a distributor unit 19. The unit 19 may be any suitable form of sequential operating distributor such as a ring counter circuit so that, by means of the output connections from distributor 19, the relays 14' of units A, B and C are closed in sequence or rotation in correspondence with the particular related pulses from three incoming data sources.

Each storage unit, and here the term refers to the combination of storage condenser 15, electron tube 16 and the cathode output load 17, is therefore connected to repeated sequence between the output of amplifier unit 11 and the input thereof. The relay 14' is an arrangement having three contacting elements, two of which are normally open and the third of which is closed as shown in the drawing where element 20 is shown as a single pole switch element and element 22 as a double pole switch element. On receiving an actuating pulse from distributor 19, the contacts normally open are closed and the contact normally closed is opened, so that in each case the output of amplifier 11 is connected to the control grid of a tube 16 via the element 20 and the cathode output of 16 is connected to the input of amplifier 11 via the upper contact of element 21. In connection with the storage unit A, wave forms have been illustrated which indicate that the contact element 20 closes after and opens before the upper contact of element 21. This is a preferred manner of arranging the operation of the relays so that the proper charge is placed on the storage condenser 15 and held there before the lower connection is opened. The small intervals between the overlapping operation of their contacts is such that the amplifier 11 is not seriously overloaded or in any event may quickly recover from momentary overload.

The lower contact of the element 21 of relay 14' is utilized to connect an additional impedance 22 in parallel with load resistor 17, during the long storage interval, but to remove it during the operational period when a pulse is received.

The impedance 22 is designed to have an impedance which equals that of the combination of circuit elements 23, 18 and other elements of the feed-back path. This impedance is in parallel with resistor 17 during the sampling storage interval. After the sampling storage interval, the equivalent impedance 22 is connected in parallel with 17 so that the measured value of output potential is accurately maintained.

It will be evident, now, that as the particular pulses corresponding to the data which is to be stored in a particular corresponding storage stage arrive at the input to receiver 11, the operation is such as to compare the stored potential and correct it to a value corresponding to the peak value of the received pulse. Thus, the storage circuits A, B and C, by means of the relay switches 14', are coupled in turn between the output of amplifier unit 11 and the input thereof to establish a feed-back path during the occurrence of the pulses of the particular sequence to which the storage circuit corresponds.

While the arrangement as described is for very precise operation in connection with a data transmission system or a computing device and, as illustrated, employs electro-mechanical relays which require some time for operation, it will be clear to those skilled in the art that the arrangement shown may be modified by employing electronic elements as relay devices, so that the operation may be made very much faster as may be required in a time multiplex system where the incoming pulses represent sampled amplitudes of telephone signals, high speed computer signals, or the like.

While there has been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A storage circuit comprising a negative feedback amplifier for producing a low impedance source of direct current potential of amplitude equal to the peak value of a short duration pulse and for adjusting said amplitude in accordance with the peak value of each subsequently received pulse, said amplifier comprising a high gain polarity reversing direct current amplifier unit and a potential storage unit, said storage unit comprising a storage condenser coupled to the input of a cathode-follower circuit, means coupling the output of said cathode follower circuit to the input of said amplifier unit and means operatively controlled by said pulses for connecting said storage unit to the output of said amplifier unit to provide a negative feed-back during the occurrence of each pulse.

2. A multiple storage circuit comprising an amplifier having a negative feed-back path for producing a plurality of low impedance sources of direct current potential each of amplitude equal to and corresponding to the peak value of a particular received pulse, and for periodically adjusting each amplitude in accordance with the peak values of subsequently received sequences of pulses comprising a high gain amplifying unit and a plurality of potential storage units and means for coupling each of said storage units between the output of said amplifier unit and said feed-back path during the occurrence of the pulse of the particular sequence to which it corresponds.

3. A multiple storage circuit comprising a negative feed-back amplifier for producing a plurality of low impedance potential sources each substantially equal to and corresponding to the peak values of a particular sequence of received pulses, said amplifier comprising a high gain amplifying unit and a plurality of potential storage units and means for coupling each of said storage units between the output of said amplifier unit and the input thereof to establish a feed-back path during the occurrence of the pulses of the particular sequence to which it corresponds.

4. A multiple storage circuit comprising a negative feed-back amplifier having substantially unity gain for producing a plurality of low impedance potential sources each substantially equal to and corresponding to the peak values of a particular sequence of received pulses, said amplifier comprising a high gain amplifying unit and a plurality of potential storage units and means for coupling each of said storage units between the output of said amplifier unit and the input thereof to establish a feed-back path during the occurrence of the pulses of the particular sequence to which it corresponds.

5. A multiple storage circuit comprising a negative feed-back amplifier for producing a plurality of low impedance potential sources each substantially equal to and corresponding to the peak values of a particular sequence of received pulses, said amplifier comprising a high gain amplifying unit and a plurality of potential storage units, each of said storage units comprising a potential storage element and a cathode-follower circuit and means for coupling each of said storage units between the output of said amplifier unit and the input thereof to establish a feed-back path during the occurrence of the pulses of the particular sequence to which it corresponds.

6. A multiple storage circuit comprising a negative feed-back amplifier for producing a plurality of low impedance potential sources each substantially equal to and corresponding to the peak values of a particular sequence of received pulses, said amplifier comprising a high gain polarity reversing direct current amplifying unit and a plurality of potential storage units, each of said storage units comprising a potential storage element and a cathode-follower circuit and means for coupling each of said storage units between the output of said amplifier unit and the input thereof to establish a feed-back path during the occurrence of the pulses of the particular sequence to which it corresponds.

7. A storage circuit comprising a negative feedback amplifier for producing a low impedance source of direct current potential of amplitude equal to the peak value of a short duration pulse and for adjusting said amplitude in accordance with the peak value of each subsequently received pulse, said amplifier comprising a high gain polarity reversing direct current amplifier unit and a potential storage unit, means for coupling the output of said storage unit to the input of said amplifier unit, and means operatively controlled by said pulses for connecting the input of said storage unit to the output of said amplifier unit.

References Cited in the file of this patent

UNITED STATES PATENTS

| | | |
|---|---|---|
| 2,422,334 | Bedford | June 17, 1947 |
| 2,482,973 | Gordon | Sept. 27, 1949 |
| 2,491,029 | Brunn | Dec. 13, 1949 |
| 2,498,678 | Grieg | Feb. 28, 1950 |
| 2,516,356 | Tull et al. | July 25, 1950 |
| 2,529,547 | Fisher | Nov. 14, 1950 |
| 2,549,873 | Williams | Apr. 24, 1951 |
| 2,567,845 | Hoagland | Sept. 11, 1951 |